United States Patent
Bolz et al.

(10) Patent No.: US 10,996,667 B2
(45) Date of Patent: May 4, 2021

(54) CONSTRUCTION MACHINE, IN PARTICULAR EARTH- MOVING MACHINE, HAVING A CONTROL PANEL

(71) Applicant: Liebherr-Hydraulikbagger GmbH, Kirchdorf/Iller (DE)

(72) Inventors: Gerhard Bolz, Kirchdorf/Iller (DE); Dieter Ansorge, Rot an der Rot (DE); Florian Mang, Memmingen (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 0 days.

(21) Appl. No.: 16/227,526

(22) Filed: Dec. 20, 2018

(65) Prior Publication Data
US 2019/0196462 A1    Jun. 27, 2019

(30) Foreign Application Priority Data
Dec. 22, 2017 (DE) ...................... 10 2017 131 264.1

(51) Int. Cl.
| G05D 1/00 | (2006.01) |
| E02F 9/20 | (2006.01) |
| G06F 1/16 | (2006.01) |
| G06F 21/31 | (2013.01) |
| B66C 13/16 | (2006.01) |

(Continued)

(52) U.S. Cl.
CPC ........... *G05D 1/0016* (2013.01); *B66C 13/16* (2013.01); *E02F 9/205* (2013.01); *E02F 9/2012* (2013.01); *E02F 9/2033* (2013.01); *E02F 9/26* (2013.01); *E02F 9/267* (2013.01); *G05D 1/0044* (2013.01); *G06F 1/163* (2013.01); *G06F 21/31* (2013.01); *H04N 7/18* (2013.01); *G05D 2201/0202* (2013.01)

(58) Field of Classification Search
CPC ............................ G05D 1/016; G05D 1/0044
See application file for complete search history.

(56) References Cited

U.S. PATENT DOCUMENTS

| 7,102,623 B2 | 9/2006 | Morath |
| 2002/0188425 A1* | 12/2002 | Nakagawa ............. G07C 5/085 |
| | | 701/29.4 |

(Continued)

FOREIGN PATENT DOCUMENTS

| DE | 10155006 A1 | 5/2003 |
| DE | 202 07 722 U1 | 9/2003 |

(Continued)

OTHER PUBLICATIONS

"Fendt 720, 722, 724 Vario," Fendt 700 Series Operator's Manual, Jun. 1, 2011.

*Primary Examiner* — Imran K Mustafa
(74) *Attorney, Agent, or Firm* — Dilworth & Barrese, LLP

(57) ABSTRACT

The present invention relates to a construction machine, in particular an earth-moving machine, having at least one control panel for inputting operator commands for the control of the construction machine, wherein the control panel has at least one display means for representing an operating interface that can be dynamically generated for the machine control; and in that a control unit is provided that recognizes a change of the mode of operation of the construction machine and adapts the operating interface in dependence on the change of the mode of operation.

15 Claims, 5 Drawing Sheets

(51) Int. Cl.
  *E02F 9/26* (2006.01)
  *H04N 7/18* (2006.01)

(56) References Cited

U.S. PATENT DOCUMENTS

| | | | |
|---|---|---|---|
| 2008/0082345 A1* | 4/2008 | Greiner | G06Q 10/06 |
| | | | 705/305 |
| 2008/0188954 A1 | 8/2008 | Thomson et al. | |
| 2010/0049410 A1 | 2/2010 | McKee | |
| 2013/0079974 A1 | 3/2013 | Stake | |
| 2014/0088840 A1* | 3/2014 | Baumgarten | A01D 41/127 |
| | | | 701/50 |
| 2014/0297160 A1* | 10/2014 | Magaki | E02F 9/26 |
| | | | 701/103 |
| 2014/0298228 A1 | 10/2014 | Meegan et al. | |
| 2016/0063332 A1* | 3/2016 | Sisbot | G02B 27/0179 |
| | | | 382/104 |
| 2016/0132618 A1* | 5/2016 | Lovell | G01D 3/02 |
| | | | 703/8 |
| 2017/0076597 A1* | 3/2017 | Beattie, Jr. | G08G 1/0112 |

FOREIGN PATENT DOCUMENTS

| | | |
|---|---|---|
| DE | 112011101720 T5 | 3/2013 |
| DE | 102012014655 A1 | 3/2014 |
| DE | 102016012786 A1 | 4/2018 |
| EP | 0 811 728 A1 | 12/1997 |
| EP | 1883871 B1 | 2/2008 |

* cited by examiner

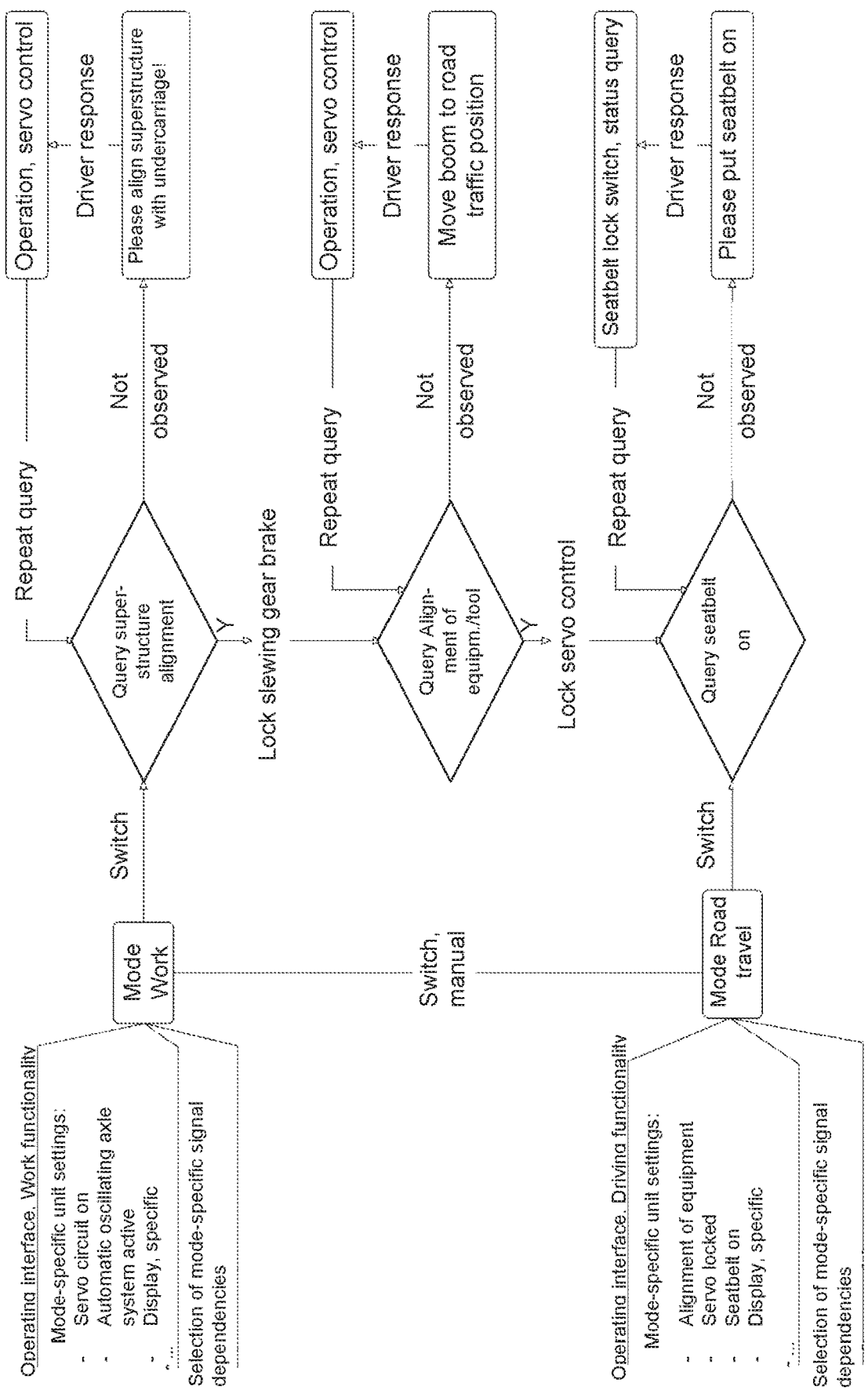

Fig. 4e
Fig. 4f
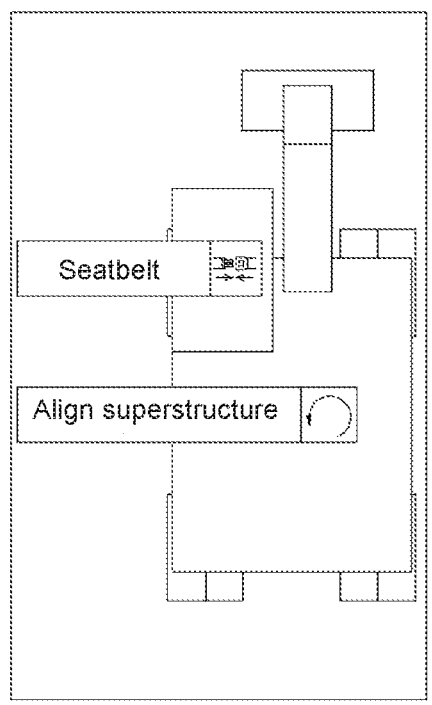
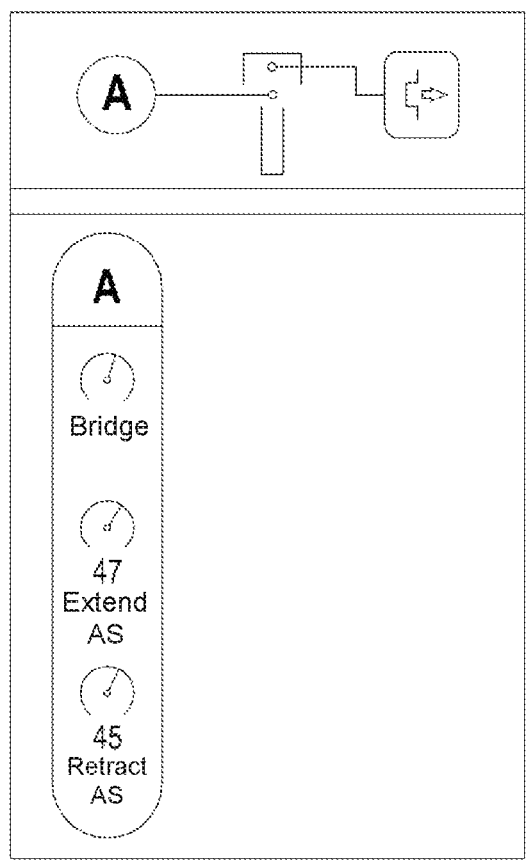
Fig. 4f
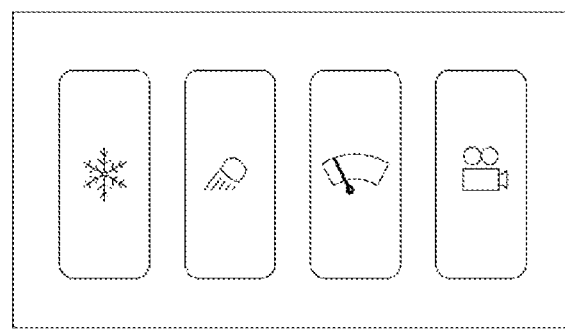

CONSTRUCTION MACHINE, IN PARTICULAR EARTH-MOVING MACHINE, HAVING A CONTROL PANEL

BACKGROUND OF THE INVENTION

The invention relates to a construction machine, in particular an earth-moving machine, having a control panel.

As technical progress grows, the functional extent in the control of modern construction machinery will steadily increase. The operator of the construction machine is admittedly better assisted by the higher degree of automation in the control of the construction machine; however, the control panel thereby also becomes more and more extensive and ultimately confusing for the operator for the control of the construction machine.

An existing construction machine in the form of a hydraulic excavator is named as an example. Two joysticks are typically arranged to the right and to the left next to the driver's seat in the operator's cabin. A large number of further operating elements, for example buttons or switches, are furthermore provided in the reachable environment of the driver's seat, in particular in the control console or in the right side paneling. An arrangement of the operating elements at positions within the cabin that can be comfortably reached by the operator is desirable; however, this will probably only be possible with difficulty in the future due to the growing number of operating elements. As a result, an arrangement has to be accepted that is widely scattered in part.

The buttons/switches are usually designed in the form of membrane keyboard surfaces or also switches actuable by fingers. To mark the assigned function, the operating elements have defined symbols printed on or are provided with suitable legends in direct proximity to the operating element. Feedback after actuation of the individual operating elements only takes place in the form of light effects.

The functional allocation and the arrangement of the operating elements are fixedly predefined and can only be changed, if at all, with a great effort.

SUMMARY OF THE INVENTION

The inventors have recognized the problems described above and have set themselves the task of developing an innovative concept for a control panel for controlling a construction machine that is able to overcome the above-named problems.

This object is achieved by a construction machine having the features herein. Advantageous embodiments of the construction machine are also the subject matter herein.

In accordance with the invention, a construction machine is proposed, in particular an earth-moving machine, particularly preferably an excavator, for example in the form of a hydraulic excavator, having at least one control panel for inputting operator commands for the control of the construction machine. The heart of the invention is the equipping of the control panel with at least one display means that has a representation of an operating interface for machine control that can be dynamically generated. A control unit is additionally provided for the control of this display means that recognizes a change of the operating mode of the construction machine and adapts the operating interface accordingly in dependence on the operating mode change.

This construction solution therefore provides the possibility of providing a compact control panel that dynamically generates a corresponding operating interface for controlling the machine in dependence on the unit mode, i.e. in dependence on the work processes to be carried out.

The generated operating interface is preferably a graphical operating interface, in particular having one or more graphical operating symbols, for example in the form of switches, buttons, or other operating elements, and/or having switch designations or button designations. A restricted selection of functions or control commands adapted to the respective operating mode is accordingly dynamically presented to the operator. The control unit consequently determines which functions and control commands are permitted or at all sensible for the respective operating mode prior to the actual generation of the operating interface.

Other operating elements to which no relevant function accrues for the current unit mode or work process are either specifically marked, suppressed, or not even displayed at all to optimize the clarity of the control panel.

The display means of the control panel is a touch-sensitive display element in accordance with a preferred embodiment. The actuation of the operating elements presented by the operating interface consequently takes place by touching the respective position at the display means. The touch display can be a multi-touch display.

It is also conceivable that the control panel comprises one or more real operating elements whose legend can be changed by means of the display means and whose functional allocation can accordingly also be changed by the control unit.

The control panel can furthermore comprise at least one information display element that does not output any operating elements, but is rather only intended for an output of information. This informative display element can, however, also be an element of the display means for the display of dynamic operating elements.

The information output likewise takes place by means of a graphical user interface that divides one or more information fields on the available display surface in an ordered manner. The control unit can likewise be configured to dynamically adapt or generate the user interface of the information display element in dependence on the detected unit mode. For example, only information fields relevant to the respective unit mode can also be displayed here.

In accordance with a preferred embodiment the regular operating mode is, for example to be understood as the operating mode of the construction machine; in the case of an excavator, for example, the regular excavator operation. A further operating mode can be the travel operation of the construction machine to be able not only to move it on the construction site, but also likewise to be able to travel in road traffic. A service or test operation can furthermore be understood as the operating mode.

In view of the aforesaid different operating modes, it can thus be sensible to fade in corresponding operating elements for regular excavation operation over the display element of the control panel during the active unit mode "Working operation" and to provide them for the invocation of function. The same applies to the information display element. If the operator then changes the travel operation, the display element of the control panel displays corresponding operating elements for the locomotion of the construction machine on the construction site or in road traffic and travel information such as the current speed, navigation data, etc. is, for example, output on the information display element.

The same applies in a suitable manner for the unit mode of service or test operation.

This procedure has the advantage that the operator quickly receives a clear display of the available operating elements in the respective unit mode. The invention equally also reduces the risk of incorrect operations since the operating elements not required in the respective unit mode and the corresponding functions are suppressed and are therefore not available for selection and actuation from the start.

The dynamic generation of the operating interface, i.e. the display of any operating elements or simply the display of information, can, however, not only take place on the basis of the current operating mode of the construction machine, but the control unit can also recognize changes in the machine state and can dynamically adapt the operating interface in dependence on recognized state changes. A possible state can, for example, be the corresponding setup of the construction machine. In the case of an excavator, the installation of the corresponding attachment item can be understood by this. Depending on the installed attachment item, the matching operating elements for controlling the attachment item are then displaced on the control panel. For example, the control unit can recognize a completed tool change on the construction machine and can subsequently adapt the operating interface of the display means. The same can be the case on the partially automated invocation of a tool monitoring and of a light control.

A unit state or machine state that triggers an adaptation of the operating interface can, for example, also be a difference between a desired value and an actual value of any desired feedback loop of the construction machine. A corresponding automation of the air conditioning of the cab of the construction machine can be named as an example here. If a difference of the desired inner temperature of the cab from the actual inner temperature is determined by the control unit, the control unit can automatically have corresponding operating elements for the air conditioning control displayed to draw the operator's attention to this defect and to simultaneously offer him matching operating elements for readjustment.

There is furthermore the possibility that the control unit automatically or semi-automatically recognizes changes of the prevailing environmental conditions. An adaptation of the dynamically generated operating interface of the display means or of the information display element can then take place in dependence on recognized changes. It is conceivable here that matching operating elements are displayed in dependence on values for twilight, precipitation or temperature. Operating elements for the light control of the construction machine can ideally be displayed from a certain twilight value onward. Certain precipitation values trigger the display of operating elements for controlling a windshield wiper system while operating elements for the air conditioning of the operator's cab can be displayed at corresponding outside temperatures.

The control unit can furthermore be configured such that it recognizes specific manual user inputs and adapts the operating interface of the display element accordingly in response thereto. Those inputs should be understood by these specific user inputs that are not actuated via the operating interface, but were used, for example, by means of an external fixed operating element. Operating inputs via master operating elements such as actuators arranged next to the drivers seat are specifically to be understood thereby.

If the operator, for example, actuates a fixedly installed actuator with which a specific function such as the control of the support is associated, the operating interface displayed or the display on the information display element is automatically adapted to the process for actuating the support.

A plurality of factors have been named above that are evaluated and taken into account by the control unit to subsequently dynamically generate a corresponding operating interface. It can be advantageous to weigh these factors differently for the adaptation of the operating interface or of the display on the information display element to control their effect on the respective adaptation. A change of the operating mode by the control unit is sensibly given a higher priority than the other influences. Provision is furthermore made that both the display means of the control panel and any information display element provide display regions that can be personalized. The virtual display can hereby be adapted to the respective user requirements. The basis can be the storage of user profiles in the control unit or an externally invokable memory. It is furthermore meaningful to equip the control unit or the construction machine with some authentication means that automatically invoke the associated user profile after a successful user authentication and that adapt the operating interface and/or the display at the information display element in accordance with the profile settings.

A further aspect of the invention provides actively assisting the user on the switching between different modes of operation. As a rule, it is absolutely necessary that certain presettings have to be made at the construction machine for the activation of a specific mode of operation. Possible machine settings and machine parameters present as well as specific position data or alignments of individual construction machine components count as presettings to be checked and monitored. After a recognized desired switchover into a different unit mode, the control unit automatically performs a check of the presettings relevant to the mode. Depending on the test result, a correction process can advantageously be triggered to adapt the detected presettings, with the correction process either actively drawing the users attention to the required correction of the respective presetting, for example by a visual prompt and ideally a suitable fading in of the required operating elements, or with the control unit being able to automatically carry out the correction and advising the user of the correction that has been made where necessary.

For example, with a mobile excavator, the superstructure first has to be aligned for the activation of the mode "road travel" and then the slewing gear has to be locked. In this case, the control unit actively prompts the user to move the superstructure into the corresponding position. If the user follows this prompt, the control unit can subsequently automatically lock the slewing gear, for example.

In accordance with an advantageous embodiment, the construction machine, in particular the control unit, can be designed with at least one interface for the communication with at least one mobile device. The interface particularly preferably serves the communication with so-called wearables.

Provision is made in accordance with a further preferred embodiment that the construction machine, in particular the control unit, at least detects the current position of the coupled mobile device in the direct working environment of the construction machine. The detected current position can then be taken into account in the machine control, preferably in the control of any machine actuators to eliminate the risk of a collision between machine components and a person taking along the mobile device. It is also conceivable that the control unit is configured to output the position of all the mobile devices coupled via the interface to the operator of the construction machine via a display element.

It is equally conceivable that remote access to the operating interface shown on the display means can take place by means of the coupled mobile devices.

BRIEF DESCRIPTION OF THE DRAWINGS

Further advantages and properties of the invention will be explained in more detail with reference to an embodiment shown in the Figures. There are shown:

FIG. 3: a block diagram in accordance with FIG. 2 for a specific mode change between working operation and travel operation; and FIGS. 4A, 4B, 4C, 4D, 4E, 4F and 4G: different screenshots of the display element of the control panel.

DESCRIPTION OF THE PREFERRED EMBODIMENTS

The construction machine in accordance with the invention and the behavior of the innovative control panel will be illustrated with reference to the following FIG. 1.

As has already been described in detail above, the key idea of the invention comprises an operating interface that can be dynamically generated. A large proportion of the functional keys for the control of the construction machine that are otherwise implemented in hardware is now simulated by means of a graphical operating interface that displays the respective relevant operating elements in dependence on the mode of operation, on the machine state, and on further influence factors. The displayed operating elements are here restricted to the respective relevant functions for the work process to be carried out so that the total control panel is not only clearly and easier to handle for the machine operator, since the reduced number of operating elements can be positioned at the point ideally reachable for the machine operator, but operating safety can also be increasingly improved since the likelihood of accidental incorrect inputs can be reduced.

The control panel comprises a display element in the form of a touch-sensitive touch display that serves the display of a graphical operating interface. An information display is further provided that only displays machine data to the operator. It is achieved by means of the invention, in particular by means of the control unit, that both the operator interface on the touch display and the information display are adapted during operation in dependence on the work process and on the unit state.

Both the information display and the touch display for operation are arranged easily visible in relation to the operator within the construction machine cab. The touch display is in particular arranged ergonomically with respect to the unit operator. The information display and the touch display can be separate from one another or can be implemented as a common compact unit. A removable solution is also conceivable for both units.

The information display and the operating interface of the touch display can be able to be retrofitted and expandable in a simple manner by newly implemented functions (e.g. recognition of a new attachment tool). Both elements can equally provide partial regions that can be personalized both in the display and in the operating interface and that can be designed and stored for different operators depending on personal wishes. It is sensible in this case if the operator is input or is automatically recognized. The personalized settings are ideally recognized and made available over all the devices.

A particular aspect of the invention comprises the operation being structured and only the operating and setting possibilities relevant in the respective work process being provided in dependence on specific priorities.

Figure 1:
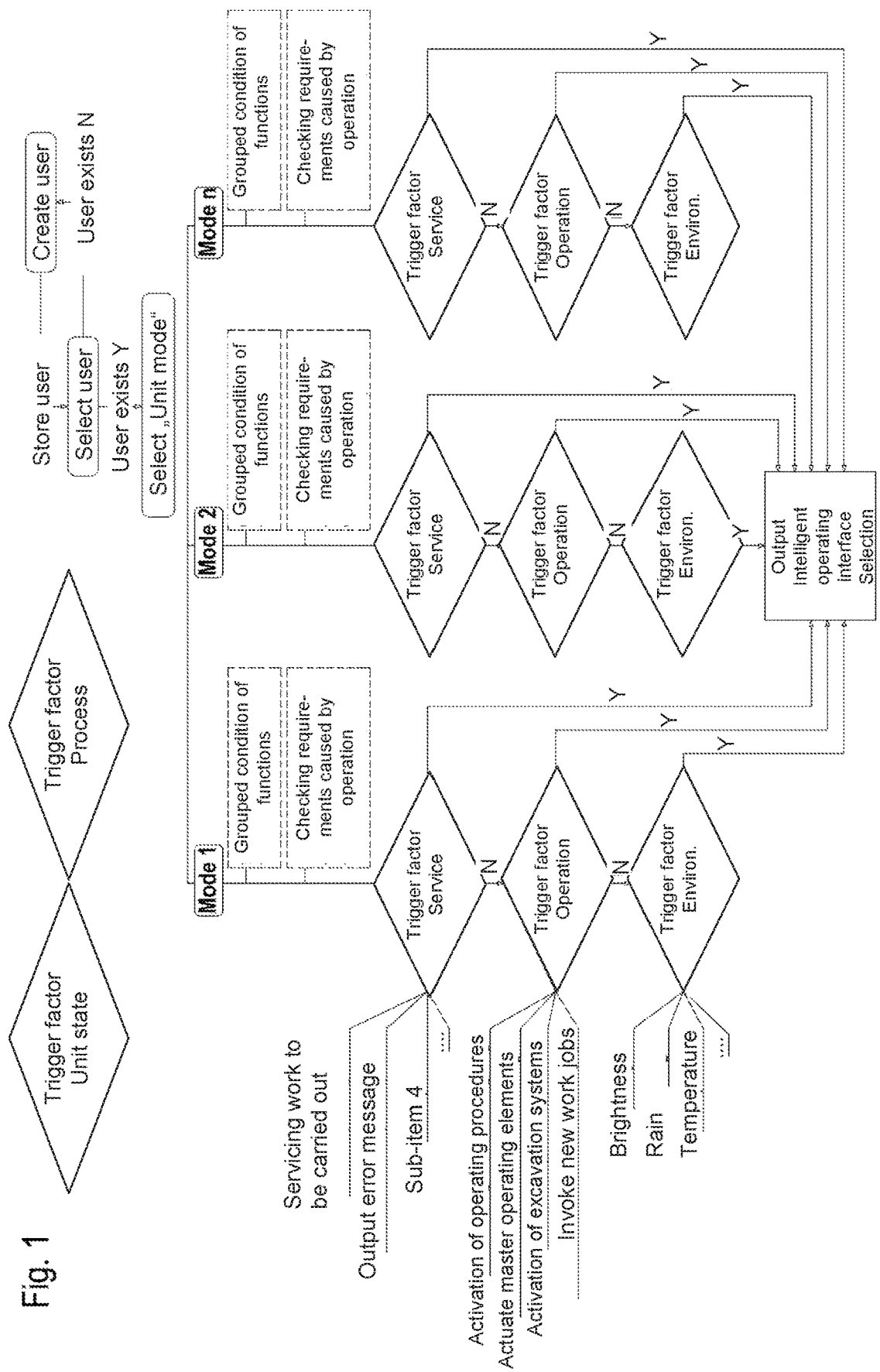
FIG. 1: a block diagram to illustrate the prioritization of the influence factors for the dynamic generation of the operating interface.

The prioritization of the individual influence factors for the dynamic generation of the operating interface and for the graphical design of the information display is illustrated in FIG. 1. The authentication of the operator of the construction machine takes place at the start of the process. In the following, an excavator that has a crane cabin having the control panel in accordance with the invention is assumed as the construction machine for the explained embodiment. After a corresponding user authentication that takes place, for example, via a cordless communication interface between the control unit and a wearable, a corresponding user profile is loaded that is stored in the control unit and is used in the following for every generation of the user surface. If the user was previously unknown, a new profile can first be created.

Figure 4A:
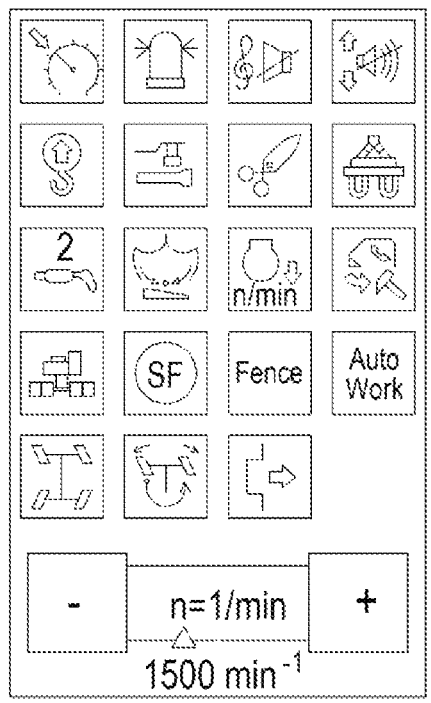

A check is subsequently made by the control unit as to which unit mode is currently active or whether there is a desire to switch between respective unit modes. The relevant functions for operating the construction machine in the respective mode are determined and grouped for the selected unit mode, here modes 1, 2, or 3. In addition, a check of the required preconditions for the respective mode is made. The latter will be explained in detail below with respect to FIG. 2 or 3. An operating mode can, for example, comprise the regular working operation (e.g. excavation mode with an excavator). After selection of the corresponding mode, matching operating elements are displayed on the touch display of the control panel. A screenshot for a possible representation of the operating interface is shown in FIG. 4a. Each box can be selected and the associated function can be invoked by touch input. The associated functions are self-explanatory through a matching symbol system.

A second mode can be road travel, for example. After a corresponding selection of the mode, the operating interface shown by way of example in FIG. 4b could then be displayed on the touch display. A clear difference can be recognized with respect to the number of operating elements and to their associated functions.

In a next step, after an activation of the respective mode, the control unit can now query whether other influence factors are present that have an influence on the dynamic generation of the operating interface or on the information display. The trigger factors service, operation, or environment are named by way of example here. The first is recognized by a service desire of the operator, for example in that a corresponding switch is actuated or a service device is connected to an interface provided for that purpose. If a service desire is present, an adaptation of the operating interface to the service task takes place immediately in that the required operating elements for the carrying out of service work are faded in.

Figure 4B:
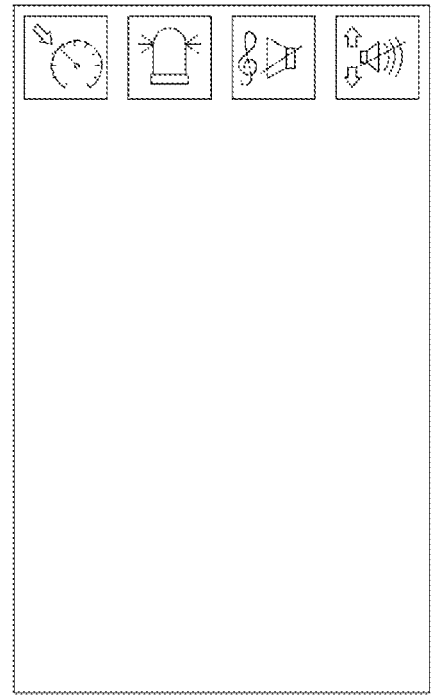
Figure 4C:
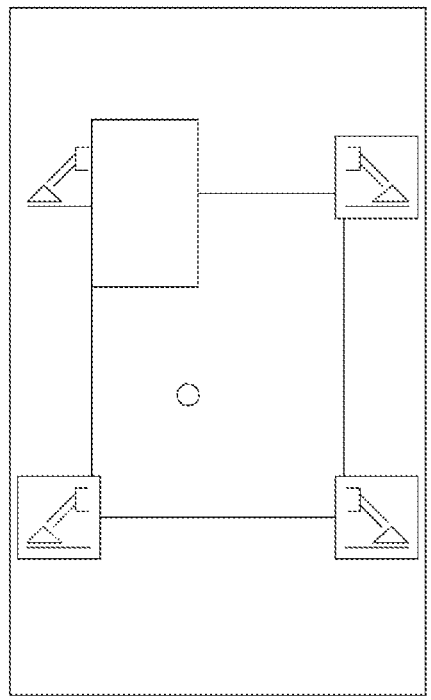

If no corresponding service desire is recognized, the control unit makes a further check as to whether specific operating inputs are present. They include, for example, the actuation of a master operating element such as a gripper to control individual actuators of the construction machine, in particular an activation of the excavation system or also generally the invoking of new work jobs. The matching operating interface is immediately generated in the case of a positive check. An example for the operating interface then output or for the representation on the information display is shown in FIG. 4c. It is displayed immediately if a master operating element for the control of the excavator support is actuated by the excavator operator.

Figure 4D:
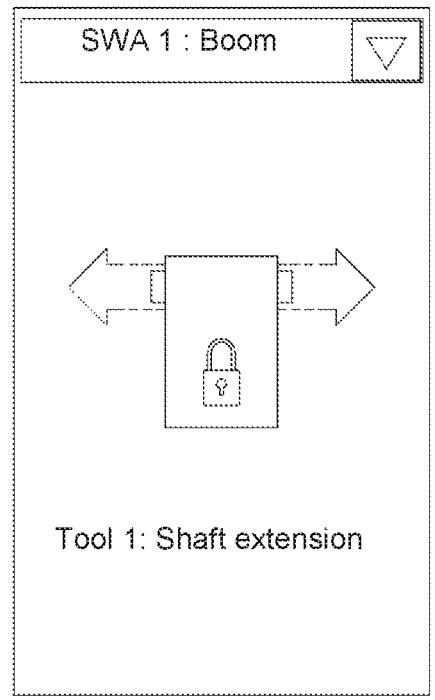

An automatic adaptation of the operating interface could, however, also take place when a state change is recognized at the excavator. This is the case on a tool change, for example. The resulting operating interface is shown in FIG. 4d that displays a change to the user and that simultaneously makes possible some settings to adapt certain machine settings to the new tool.

If no corresponding operating inputs can be found by the control unit, the presence of relevant environmental influences is checked and an adaptation of the operating interface is performed as necessary. These include, for example, the light conditions of the environment recognized by means of a sensor system, the current precipitation and the environmental temperature or the temperature within the machine cab. If required, the operating interface can here be supplemented by operating elements for light control, windshield wipers, or the air conditioning inside the cab.

Figure 2:
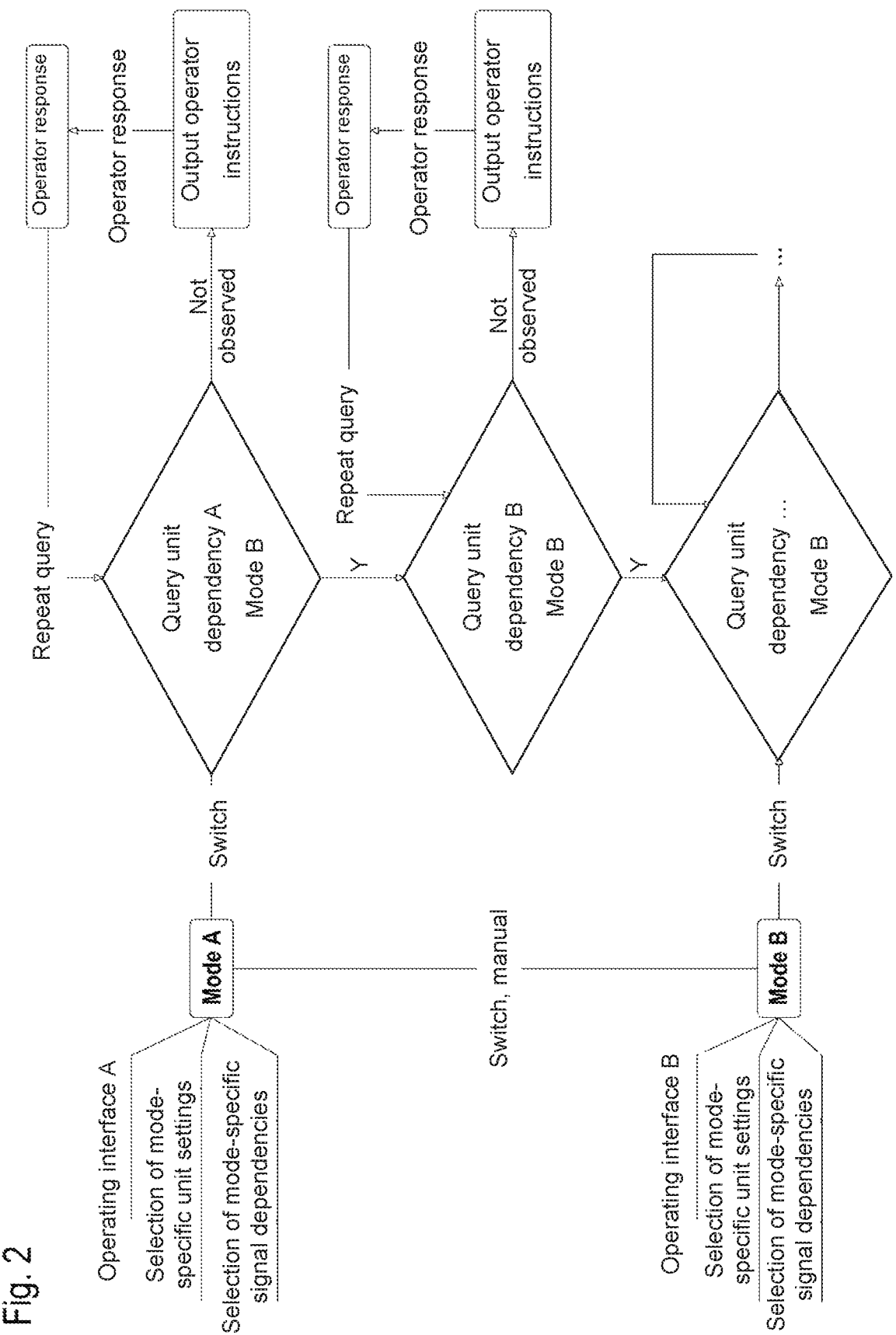
FIG. 2: a block diagram to illustrate the process for the querying of unit dependencies on a mode change.

FIG. 2 now shows the running process for the checking of any device dependencies on a change of mode. For example, it is recognized by the control unit here that the user intends a change of unit mode from mode A to mode B. In this case, the control unit checks any unit settings, unit orientations, or unit parameters as to whether they satisfy the requirements for the change to unit mode B. The check first starts with the unit dependence A. If the associated value A does not satisfy the demands for a mode change, the machine operator is made aware of this and is actively prompted to make a correction, preferably in that the suitable operating elements are simultaneously faded in. After a successful operator interaction, the next unit dependence B is checked in an analog manner and is corrected as necessary. As soon as all unit dependencies have been satisfied, the mode change can be performed and the operating interface can be adapted to the new mode.

A specific example for such a change of mode with an excavator is shown in FIG. 3. The excavator here should be switched from the unit mode "Work" to the unit mode "Road travel". There are mode-specific unit settings in the unit mode "Work". For example, the servo circuit has to be switched on, an automatic oscillating axle system has to be active, and the corresponding display of the control panel has to be matched to the unit mode "Work" (see FIG. 4a, for example). If a corresponding desire for a mode change is recognized, the control unit first checks the orientation of the superstructure, in particular whether the slewing position of the superstructure satisfies the requirements for road travel. If, for example, the superstructure angle differs from the predefined slew angle, a corresponding prompt is given to the operator (see FIG. 4e) to correspondingly align the superstructure with respect to the undercarriage. The control unit here continuously checks whether the excavator operator carries out corresponding operating commands, i.e. actuates the servo control to align the superstructure. If the requirement of the alignment of the superstructure is satisfied, the slewing gear brake can be automatically locked by the control unit.

In the next step a check of the next unit state is carried out by the control unit, namely the querying of the alignment of the equipment or of the attachment tool. If the equipment or the attachment tool is suitably aligned for road travel or if the operator has aligned it by a corresponding actuation after a prompt has been output by the control unit, the control unit can lock the servo control and can next query whether the operator has put on the safety belt for road travel. If this can also be affirmed at the end, the excavator is finally switched to the road travel mode and the corresponding operating interface can be generated on the display element of the control panel (FIG. 4b).

Further specific unit settings such as the steering angle resolution, reassignment of an actuator, etc. can also be adapted via the preselection of modes.

Certain individual functions can also be operated in a coupled manner. It can be named as an example that after parking and after the activation of the parking brake, the surrounding lighting and ascending lighting is also activated, the equipment is switched to unpressurized, etc.

All the functions that are the same over the different units can additionally be operated at the same position. Numerous options also result in the graphical design of the operating elements on the operating interface. The specific visual design of the operating holograms can thus indicate different operator extents and work processes. See purely as an example the representations 4f and 4g for this purpose. A purely on/off function is illustrated, for example, via a rectangular hologram with chamfered edges (FIG. 4f). Round operating elements can comprise further setting options (FIG. 4f) in addition to the function of activation/deactivation. Different functions of the operating element can be invoked by varying the time actuation of the operating element. For example, a brief actuation results in the activation/deactivation of the associated function, while a submenu or a sub-structure can be invoked by a prolonged actuation.

Equally, an elongate rectangular shape of the operating element can indicate a stored logic such as the automatic recognition of approaching twilight (FIG. 4g). Depending on the setting, the associated function can be carried out automatically or only an indication of a required setting change takes place. All the operating elements are, where necessary, designed with understandable status visualizations, schematic unit representations are in particular used to represent warnings, reports, and functions more simply and understandably. The status of the respective function can take place directly via a representation of the operating element, for example using animated frames (see FIG. 4g), using different colors, complementing with symbols (see e.g. lock symbol or arrows in FIG. 4d).

In addition to the display units for the operator, mobile end devices such as wearables can also be used for the persons involved in the operating process. The wearables can be permanently coupled to the construction machine via a contactless interface, e.g. wireless LAN device hotspots. The construction machine can detect the location of the wearables and thus of the involved persons in the direct surroundings of the work unit and can thereby recognize impending collisions with the persons during the traveling of the attachment at an early time. In addition, the positions of the construction site workers can be indicated to the occupants in the cab, for example via a plan view of the unit with superposed person icons.

The wearables additionally serve as a communication interface between all the involved persons at the work site and restricted access to the unit operation can optionally take place via the wearable such as the triggering of an emergency stop procedure in danger situations (e.g. a person monitors the excavation process and determines a collision with a ground connection). The wearable should be automatically coupled to the next closest piece of working equipment, with different functions being provided depending on the piece of working equipment.

The invention claimed is:

1. A construction machine, in particular an earth-moving machine, having at least one control panel for inputting operator commands for the control of the construction machine, wherein
the control panel has at least one display means for representing an operating interface that can be dynamically generated for the machine control;
a control unit is provided that recognizes a change of the mode of operation of the construction machine and adapts the operating interface in dependence on the change of the mode of operation which is a working operation, a travel operation or a service or test operation,
the display means are a touch-sensitive display element having adaptable designations of the operating elements of the operating field,
the display means are interconnected with the control unit to change mode of operation,
relevant functions for operating the construction machine are determined and grouped with the respective mode,
after activation of the respective mode, the control unit ascertains presence of other influence factors on the dynamic generation of the operator interface or information display, and generates a determined matching operating interface,
the control unit and display means display change of operating mode or functions, to permit an operator to activate the control unit by touching a discrete location on the display means,
the control unit is configured to determine, before adjustment of the operating interface, which functions and control commands are permitted or useful for the respective operating mode, with an operating interface having a restricted selection of operating elements configured to the recognized operating mode for executing the functions and commands generated, and
operating elements not required in the respective unit mode and the corresponding functions are suppressed and are therefore not available for selection and actuation from the start of the selected mode until transition to another mode.

2. A construction machine in accordance with claim 1, wherein the control unit is configured to recognize changes to the machine state, in particular to detect them using a sensor system, and adapts the operating interface presented by the display element in dependence on the recognized state change.

3. A construction machine in accordance with claim 1, wherein the control unit is configured to recognize changes to the environmental conditions, in particular to detect them using a sensor system, and adapts the operating interface presented by the display element in dependence on the recognized change to the environmental conditions.

4. A construction machine in accordance with claim 1, wherein the control unit is configured to recognize manual user inputs, in particular to recognize operating inputs made by one or more master elements and adapts the operating interface presented by the display element in dependence on the recognized operating input.

5. A construction machine in accordance with claim 1, wherein the control unit is configured to carry out an adaptation of the operating interface to the extent that only the operating elements and setting options relevant in the recognized mode of operation and/or work process are displayed.

6. A construction machine in accordance with claim 1, wherein the control unit is configured to prioritize the mode of operation, the machine state, the operating inputs, and the environmental influences and to take account of these factors in dependence on their priority for the adaptation of the operating interface, with the highest priority preferably being associated with the mode of operation.

7. A construction machine in accordance with claim 1, wherein means for user authentication are provided; and the control unit is configured to adapt the operating interface in dependence on a profile stored for the authenticated operator.

8. A construction machine in accordance with claim 1, wherein at least one information display element for presenting possible machine information is provided that is a component of the control panel or is designed as a separate element, with the control unit being configured to adapt the information displayed on the information display element in dependence on the active mode of operation and/or on the unit state and/or on the authenticated user and/or on environmental influences and/or on operating inputs that have been made.

9. A construction machine in accordance with claim 1, wherein the control unit is configured to detect a mode of operation triggered at the operator side and checks specific machine settings and/or unit orientations and/or machine parameters in dependence on the mode change and triggers a subsequent correction process for their adaptation as necessary.

10. A construction machine in accordance with claim 9, wherein the control unit is configured to adapt at least some of the machine settings and/or unit orientations and/or machine parameters in an automated or semi-automated manner during a correction process and/or to prompt the operator to manually adapt at least some of the machine settings and/or unit orientations and/or machine parameters.

11. A construction machine in accordance with claim 1, wherein the construction machine, in particular the control unit, has an interface for the communication with at least one mobile device, in particular a wearable.

12. A construction machine in accordance with claim 11, wherein the construction machine, in particular the control unit, detects the current position of the mobile device, in particular of the wearable, at least in the direct working environment of the construction machine and takes it into account in the machine control, in particular the control of any machine actuators, to avoid collisions between machine components and a person carrying the mobile device, with the control unit further preferably being configured to display the position of the mobile devices coupled via the interface via a display element.

13. A construction machine in accordance with claim 11, wherein remote access to the operating interface displayed on the display means is possible by the mobile device.

14. A construction machine in accordance with claim 1, wherein if the travel operation is activated,
the display element of the control panel displays corresponding operating elements for locomotion of the construction machine on a construction site or in road traffic, and
travel information such as current speed, navigation data, is output on the display element.

15. A construction machine in accordance with claim 1, wherein operating elements to which no relevant function accrues for current unit mode or work process are specifically marked, suppressed, or not displayed, to optimize clarity of the control panel.

* * * * *